(12) United States Patent
Montgomery et al.

(10) Patent No.: US 10,608,222 B2
(45) Date of Patent: Mar. 31, 2020

(54) INTEGRATED MODULES FOR BATTERY PACKS

(71) Applicant: FORD GLOBAL TECHNOLOGIES, LLC, Dearborn, MI (US)

(72) Inventors: Kevin A. Montgomery, Royal Oak, MI (US); Benjamin A. Tabatowski-Bush, South Lyon, MI (US); Robert Bolduc, Northville, MI (US); Hari Krishna Addanki, Novi, MI (US); Jeffrey Matthew Haag, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 227 days.

(21) Appl. No.: 15/272,702

(22) Filed: Sep. 22, 2016

(65) Prior Publication Data

US 2018/0083244 A1 Mar. 22, 2018

(51) Int. Cl.
| | |
|---|---|
| *H01M 2/12* | (2006.01) |
| *H01M 10/42* | (2006.01) |
| *H01M 2/10* | (2006.01) |
| *H01M 2/20* | (2006.01) |
| *H01M 10/48* | (2006.01) |
| *H01M 10/0525* | (2010.01) |

(52) U.S. Cl.
CPC ....... *H01M 2/1282* (2013.01); *H01M 2/1077* (2013.01); *H01M 2/12* (2013.01); *H01M 2/206* (2013.01); *H01M 10/42* (2013.01); *H01M 10/486* (2013.01); *H01M 10/0525* (2013.01); *H01M 2010/4271* (2013.01); *H01M 2220/20* (2013.01); *Y02E 60/122* (2013.01)

(58) Field of Classification Search
CPC .............................. H01M 2/12; H01M 2/1282
See application file for complete search history.

(56) References Cited

U.S. PATENT DOCUMENTS

| | | |
|---|---|---|
| 8,815,429 B2 | 8/2014 | Hostler et al. |
| 8,940,421 B2 | 1/2015 | Zhao et al. |
| 9,024,572 B2 | 5/2015 | Nishihara et al. |
| 2012/0043924 A1* | 2/2012 | Sheahan, Jr. ....... H01M 2/1077 320/107 |
| 2013/0164567 A1* | 6/2013 | Olsson ............... H01M 10/488 429/7 |
| 2014/0205870 A1* | 7/2014 | Utley .................. H01M 2/1252 429/53 |
| 2015/0069829 A1 | 3/2015 | Dulle et al. |
| 2015/0072195 A1 | 3/2015 | Soleski et al. |
| 2016/0036023 A1 | 2/2016 | DeKeuster et al. |
| 2016/0093862 A1 | 3/2016 | DeKeuster et al. |

FOREIGN PATENT DOCUMENTS

| | | |
|---|---|---|
| KR | 20130114419 A | 10/2013 |
| KR | 20150066077 A | 6/2015 |
| WO | WO2012027045 | * 3/2012 |

* cited by examiner

*Primary Examiner* — Olatunji A Godo
(74) *Attorney, Agent, or Firm* — David B. Kelly; Carlson, Gaskey & Olds

(57) ABSTRACT

A battery pack includes a battery assembly including a grouping of battery cells and an integrated module attached to the grouping of battery cells. The integrated module includes an upper section housing at least one electronics component and a lower section establishing a vent chamber.

26 Claims, 3 Drawing Sheets

INTEGRATED MODULES FOR BATTERY PACKS

TECHNICAL FIELD

This disclosure relates to battery packs for electrified vehicles. An exemplary battery pack includes a battery assembly including a grouping of battery cells and an integrated module attached to the grouping of battery cells. The integrated module establishes both an electronics housing and a vent chamber within the battery pack.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to power and propel the vehicle.

A high voltage battery pack powers the electric machines and other electrical loads of the electrified vehicle. The battery pack includes a plurality of interconnected battery cells that store energy for powering these electrical loads. There is often a limited amount of space available within a vehicle for accommodating the battery pack. Space efficient battery pack designs are therefore desirable.

SUMMARY

A battery pack according to an exemplary aspect of the present disclosure includes, among other things, a battery assembly including a grouping of battery cells and an integrated module attached to the grouping of battery cells. The integrated module includes an upper section housing at least one electronics component and a lower section establishing a vent chamber.

In a further non-limiting embodiment of the foregoing battery pack, the battery assembly is housed inside an enclosure assembly.

In a further non-limiting embodiment of either of the foregoing battery packs, the enclosure assembly includes a tray and a cover.

In a further non-limiting embodiment of any of the foregoing battery packs, the lower section of the integrated module houses a bus bar module that electrically connects adjacent battery cells of the grouping of battery cells.

In a further non-limiting embodiment of any of the foregoing battery packs, the bus bar module houses a plurality of bus bars.

In a further non-limiting embodiment of any of the foregoing battery packs, the upper section is separated from the lower section by a wall.

In a further non-limiting embodiment of any of the foregoing battery packs, the at least one electronics component includes a battery pack sensing module (BPSM).

In a further non-limiting embodiment of any of the foregoing battery packs, the at least one electronics component includes a battery energy control module (BECM).

In a further non-limiting embodiment of any of the foregoing battery packs, an outer perimeter of the vent chamber is established by a wall of the integrated module, top surfaces of the grouping of battery cells, and seals that extend between the wall and the top surfaces.

In a further non-limiting embodiment of any of the foregoing battery packs, the seals are foam strip seals, plastic seals, metal seals, or composite seals.

In a further non-limiting embodiment of any of the foregoing battery packs, an outer perimeter of the vent chamber is established by a wall of the integrated module, a bus bar module, and seals that extend between the wall and the bus bar module.

In a further non-limiting embodiment of any of the foregoing battery packs, the bus bar module includes at least one passage that aligns with a vent port of a battery cell of the grouping of battery cells to communicate battery vent byproducts from the vent port into the vent chamber.

In a further non-limiting embodiment of any of the foregoing battery packs, the grouping of battery cells includes a plurality of battery cells arranged in a cell stack.

In a further non-limiting embodiment of any of the foregoing battery packs, the integrated module is connected to at least a portion of the plurality of battery cells.

In a further non-limiting embodiment of any of the foregoing battery packs, the integrated module is made of a gas impervious material.

A method according to another exemplary aspect of the present disclosure includes, among other things, connecting an integrated module to a grouping of battery cells of a battery assembly. The integrated module establishes an electronics housing and a vent chamber of the battery assembly within a single, integrated unit.

In a further non-limiting embodiment of the foregoing method, the electronics housing houses at least one electronics component inside the integrated module.

In a further non-limiting embodiment of either of the foregoing methods, a bus bar module is connected to the grouping of battery cells and after connecting the bus bar module, the integrated module is connected to the grouping of battery cells such that the integrated module houses the bus bar module.

In a further non-limiting embodiment of any of the foregoing methods, the vent chamber is established by at least two seals of the integrated module.

In a further non-limiting embodiment of any of the foregoing methods, the electronics housing is separated from the vent chamber by a wall of the integrated module.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details various battery pack designs for use within electrified vehicles. An exemplary battery pack includes a battery assembly including a grouping of battery cells and an integrated module attached to the grouping of battery cells. The integrated module includes an upper section that houses at least one electronics component and a lower section that establishes a vent chamber. In some embodiments, the lower section of the integrated module houses a bus bar module that electrically connects adjacent battery cells of the grouping of battery cells. These and other features are discussed in greater detail in the following paragraphs of this detailed description.

Figure 1:
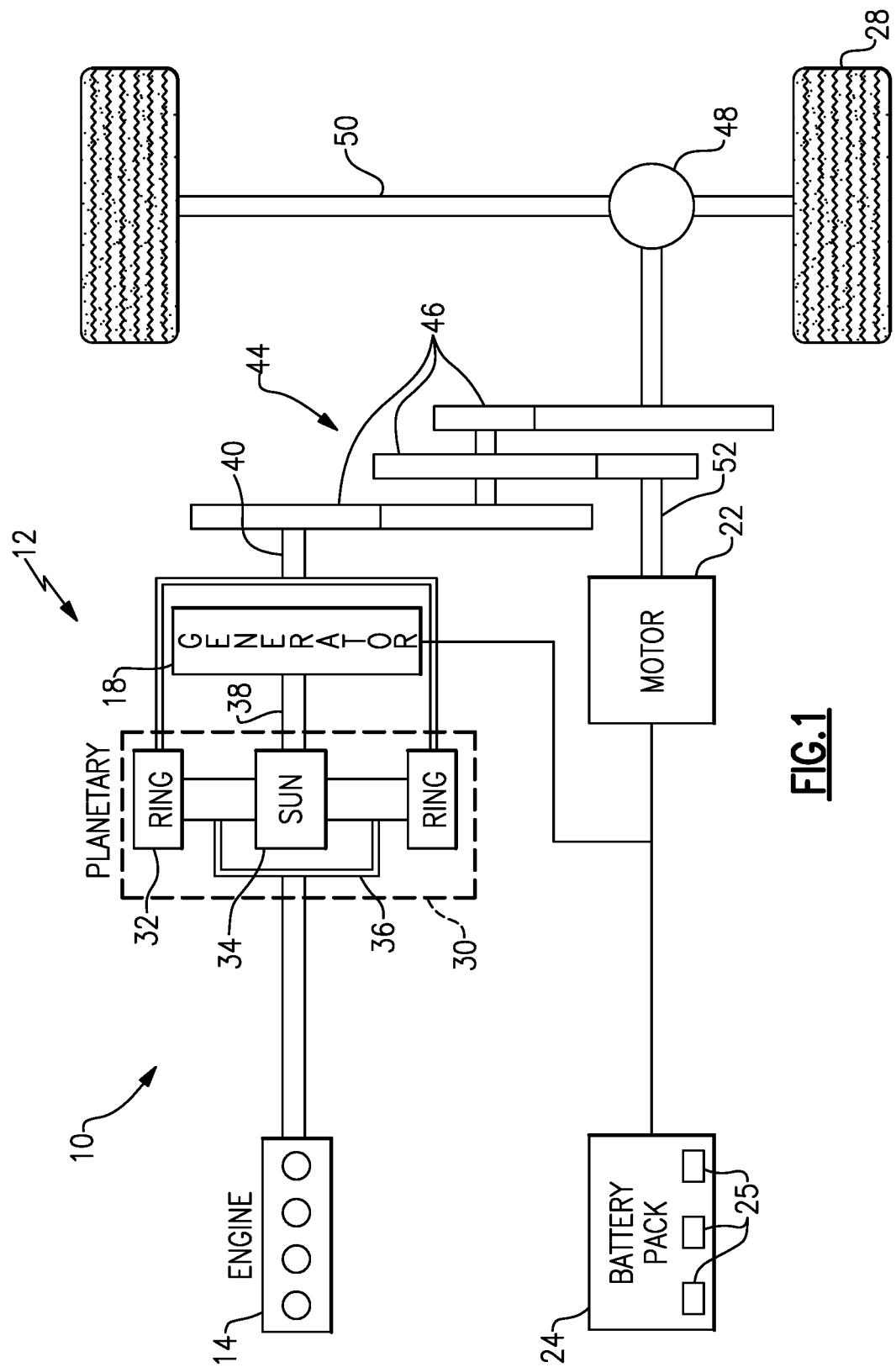
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), and fuel cell vehicles.

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
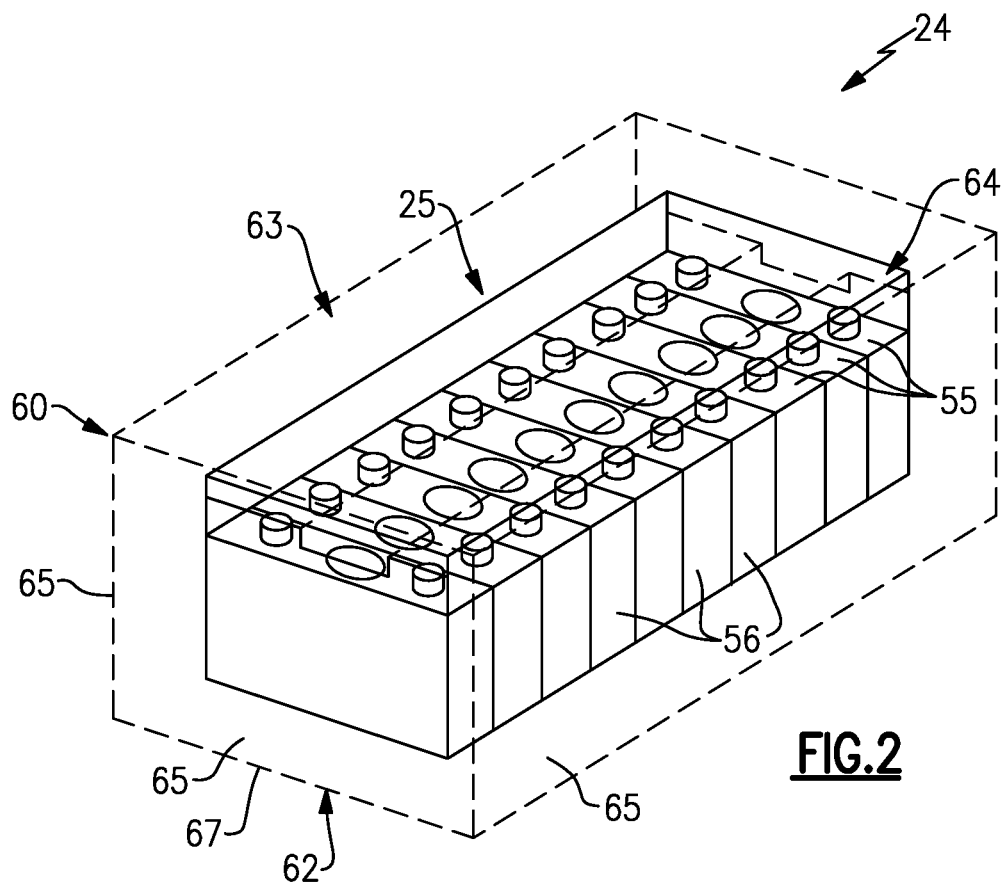
FIG. 2 illustrates a battery pack of an electrified vehicle.

FIG. 2 illustrates a battery pack 24 that can be employed within an electrified vehicle. For example, the battery pack 24 could be part of the electrified vehicle 12 of FIG. 1. FIG. 2 is a perspective view of the battery pack 24, and its external components (e.g., enclosure assembly 60) are shown in phantom to better illustrate the internal components of the battery pack 24.

The battery pack 24 includes a plurality of battery cells 56 that store electrical power for powering various electrical loads of the electrified vehicle 12. Although a specific number of battery cells 56 are depicted in FIG. 2, the battery pack 24 could employ a greater or fewer number of battery cells within the scope of this disclosure. In other words, this disclosure is not limited to the specific configuration shown in FIG. 2.

The battery cells 56 may be stacked side-by-side to construct a grouping of battery cells 56, sometimes referred to as a "cell stack." The battery pack 24 can include one or more separate groupings of battery cells 56.

In a non-limiting embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any other support structures (e.g., spacers, rails, walls, plates, bindings, etc.), may collectively be referred to as a battery assembly 25. Although the battery pack 24 of FIG. 2 is depicted as having a single battery assembly 25, the battery pack 24 could include a greater number of battery assemblies within the scope of this disclosure. In addition, although depicted as extending longitudinally inside the battery pack 24, the battery assembly 25 could alternatively be arranged to extend horizontally inside the battery pack 24.

The battery assembly 25 includes an integrated module 64 in addition to the grouping of battery cells 56. The integrated module 64 is attached to a portion of the battery assembly 25. The integrated module 64 could be snap fit, welded, bolted, or clipped into one or more of the battery cells 56 or to a battery assembly structure (e.g., side wall, end wall, etc.). In a non-limiting embodiment, the integrated module 64 is connected to and extends in span along a top surface 55 of the battery cells 56 of the battery assembly 25.

An enclosure assembly 60 houses each battery assembly 25 of the battery pack 24. In a non-limiting embodiment, the enclosure assembly 60 is a sealed enclosure that includes a tray 62 and a cover 63. The tray 62 includes sidewalls 65 that extend upwardly from a base 67 to establish one or more compartments for housing the battery assembly 25. The cover 63 is secured to the tray 62 to enclose and seal the battery assembly 25 of the battery pack 24.

Figure 3:
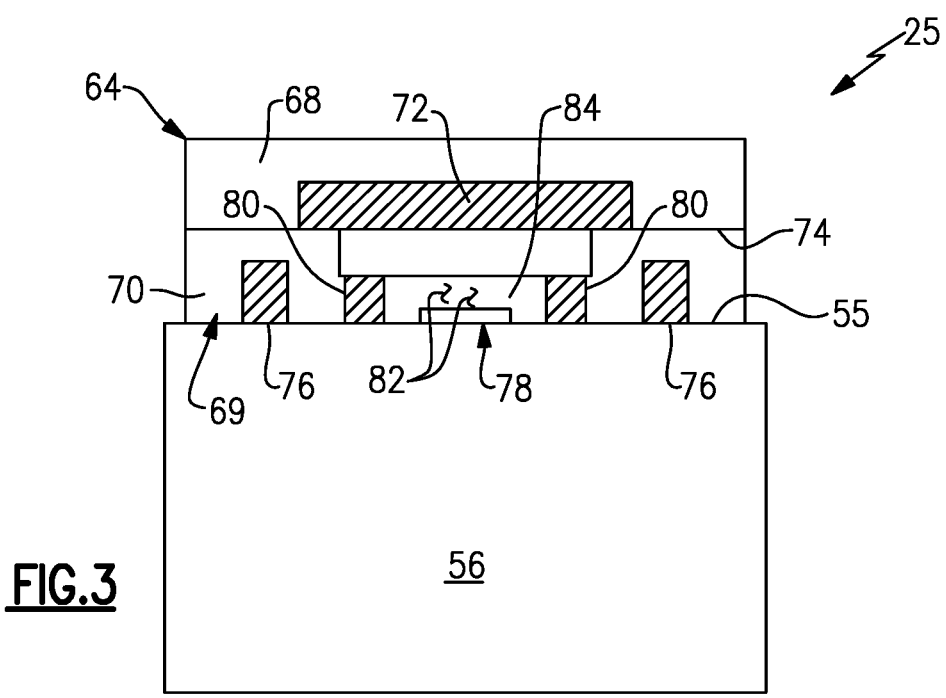
FIG. 3 illustrates a battery assembly according to a first embodiment of this disclosure.

The exemplary integrated module 64 of the battery assembly 25 is further detailed in FIG. 3. The integrated module 64 includes an upper section 68 and a lower section 70. A wall 74 divides the upper section 68 from the lower section 70. In a non-limiting embodiment, the integrated module 64 includes an open bottom 69 to expose the lower section 70 to the battery cells 56 of the battery assembly 25.

In a first non-limiting embodiment, the integrated module 64 of the battery assembly 25 is an integrated unit that is made of metallic materials. Alternatively, the integrated module 64 could be made of polymeric materials. In yet another non-limiting embodiment, the integrated module 64 is made of a combination of metallic and polymeric materials. The material of the integrated module 64 may be a gas impervious material, in another non-limiting embodiment.

The upper section 68 houses one or more electronic components 72 and thus acts as an electronics housing. The electronic components 72 could include a battery electronic controller (BEC), a battery energy control module (BECM), a battery pack sensing module (BPSM), a circuit board, wiring, or any combination of these components. Various other electronics may additionally be housed inside the upper section 68 of the integrated module 64. In a non-limiting embodiment, one or more of the electronic components 72 is adapted to monitor and/or measure information about the battery assembly 25, including but not limited to cell voltages, currents, temperatures, battery state of charge (SOC), battery power limits, etc.

The lower section 70 of the integrated module 64 rests against the battery cells 56 to cover terminals 76 and a vent port 78 of each battery cell 56. Seals 80 (here, first and second seals) may be attached to the wall 74 of the integrated module 64. The seals 80 are positioned outboard of the vent port 78. The seals 80 are foam strip seals, in a non-limiting embodiment. The seals 80 could alternatively be plastic seals, metals seals, or composite seals. Once the integrated module 64 is secured to the battery cells 56, the seals 80 abut against a top surface 55 of the battery cells 56 to establish a vent chamber 84 inside the integrated module 64. Together, the wall 74, the top surfaces 55 of the battery cells 56, and the seals 80 establish the vent chamber 84.

The vent ports 78 of each battery cell 56 are configured to expel battery vent byproducts 82, such as gases or other byproducts, from the battery cells 56 during certain battery cell venting events. For example, battery cell venting events may occur during over-temperature or over-charging conditions of the battery cells 56, or during other cell conditions. The battery vent byproducts 82 may be channeled between the seals 80 and between the wall 74 and the top surfaces 55 to a location external from the battery pack, such as through vent tubing (not shown) that is connected to the battery pack.

Figure 4:
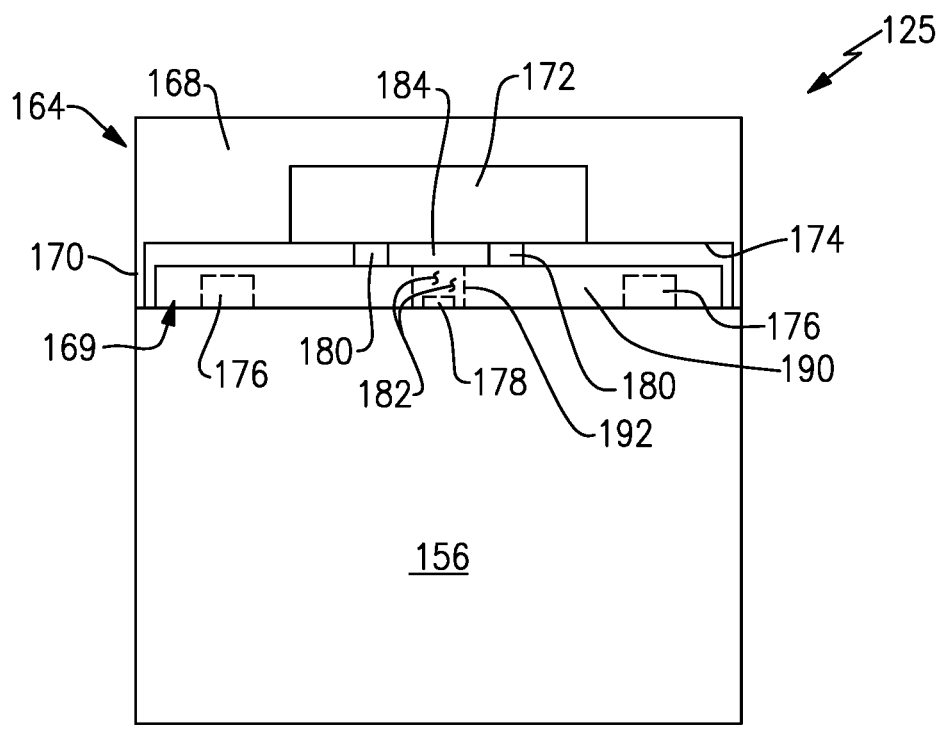
FIG. 4 illustrates a battery assembly according to a second embodiment of this disclosure.

FIG. 4 illustrates another exemplary battery assembly 125. The battery assembly 125 includes a grouping of battery cells 156 and an integrated module 164 connected to the grouping of battery cells 156. The integrated module 164 includes an upper section 168 and a lower section 170 divided from one another by a wall 174. The integrated module 164 includes an open bottom 169 to expose the lower section 170 to the battery cells 156.

The upper section 168 houses one or more electronic components 172. A bus bar module 190 is attached to cell terminals 176 of the battery cells 156 and is housed within the lower section 170 of the integrated module 164 once the integrated module 164 is received against the battery cells 156. The bus bar module 190 electrically connects adjacent battery cells 156 of the battery assembly 125 and could sense voltages and temperatures of the battery cells 156.

Seals 180 extend between the wall 174 and the bus bar module 190 to establish a vent chamber 184 inside the integrated module 164. Together, the wall 174, the bus bar module 190, and the seals 180 establish an outer perimeter of the vent chamber 184. Vent ports 178 of each battery cell 56 may expel battery vent byproducts 182 from the battery cells 156 during certain battery cell venting events. The battery vent byproducts 182 may be channeled through a passage 192 of the bus bar module 190, which is positioned above the vent ports 178, and then between the seals 180 to expel the battery vent byproducts 182 from the battery pack.

Figure 5:
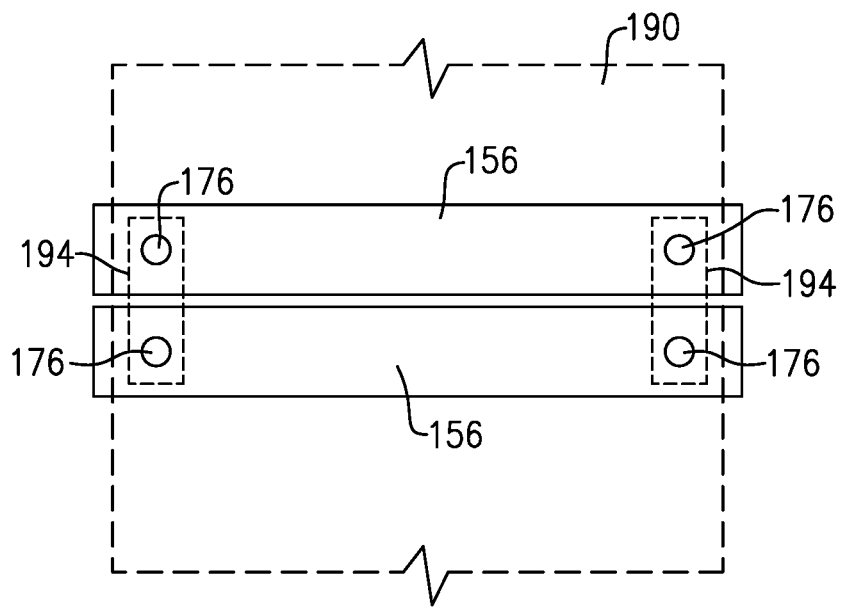
FIG. 5 illustrates a bus bar module of the battery assembly of FIG. 4.

Referring to FIG. 5, the bus bar module 190 (shown in phantom) may include a plurality of bus bars 194 (also shown in phantom). The bus bars 194 may be housed within the bus bar module 190 in any manner and are configured as metallic strips of material. Each bus bar 194 connects between terminals 176 of adjacent battery cells 156 to electrically connect the battery cells 156 of the battery assembly 125.

The exemplary integrated modules of this disclosure provide increased packaging density by combining functions (e.g., battery sensing, control, bus bar connections, venting, etc.) traditionally performed by multiple parts into a single, integrated unit. The integrated modules therefore occupy less volume and reduce the amount of part-to-part clearances that exist inside the battery pack.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
an enclosure assembly; and
a battery assembly inside said enclosure assembly and including a grouping of battery cells and an integrated module attached to said grouping of battery cells, said integrated module including an upper section housing at least one electronics component and a lower section establishing a vent chamber,
wherein said integrated module is attached directly to at least one battery cell of said grouping of battery cells.

2. The battery pack as recited in claim 1, wherein said enclosure assembly includes a tray and a cover.

3. The battery pack as recited in claim 1, wherein said lower section of said integrated module houses a bus bar module that electrically connects adjacent battery cells of said grouping of battery cells.

4. The battery pack as recited in claim 3, wherein said bus bar module houses a plurality of bus bars.

5. The battery pack as recited in claim 1, wherein said upper section is separated from said lower section by a wall.

6. The battery pack as recited in claim 1, wherein said at least one electronics component includes a battery pack sensing module (BPSM).

7. The battery pack as recited in claim 1, wherein said at least one electronics component includes a battery energy control module (BECM).

8. The battery pack as recited in claim 1, wherein an outer perimeter of said vent chamber is established by a wall of said integrated module, top surfaces of said grouping of battery cells, and seals that extend between said wall and said top surfaces.

9. The battery pack as recited in claim 8, wherein said seals are foam strip seals, plastic seals, metal seals, or composite seals.

10. The battery pack as recited in claim 1, wherein an outer perimeter of said vent chamber is established by a wall of said integrated module, a bus bar module, and seals that extend between said wall and said bus bar module.

11. The battery pack as recited in claim 10, wherein said bus bar module includes at least one passage that aligns with a vent port of a battery cell of said grouping of battery cells to communicate battery vent byproducts from said vent port into said vent chamber.

12. The battery pack as recited in claim 1, wherein said integrated module is made of a gas impervious material.

13. A method, comprising:
connecting an integrated module to a grouping of battery cells of a battery assembly of a battery pack, wherein the integrated module establishes an electronics housing and a vent chamber of the battery assembly within a single, integrated unit that is disposed inside an enclosure assembly of the battery pack,
wherein the integrated module is connected directly to at least one battery cell of the grouping of battery cells.

14. The method as recited in claim 13, wherein the electronics housing houses at least one electronics component inside the integrated module.

15. The method as recited in claim 13, comprising:
connecting a bus bar module to the grouping of battery cells; and
after connecting the bus bar module, connecting the integrated module to the grouping of battery cells such that the integrated module houses the bus bar module.

16. The method as recited in claim 13, wherein the vent chamber is established by at least two seals of the integrated module.

17. The method as recited in claim 13, wherein the electronics housing is separated from the vent chamber by a wall of the integrated module.

18. A battery pack, comprising:
an enclosure assembly;
a battery cell inside said enclosure assembly;
an integrated module connected directly to a surface of said battery cell;
a first section of said integrated module housing a control module or a sensing module; and
a second section of said integrated module housing a bus bar module and establishing a vent chamber for receiving byproducts from a vent port protruding from said surface of said battery cell.

19. The battery pack as recited in claim 1, wherein said integrated module is snap fit, welded, bolted, or clipped directly to said at least one battery cell.

20. The battery pack as recited in claim 1, wherein said lower section includes an open bottom received over a vent port of said grouping of battery cells.

21. The battery pack as recited in claim 1, wherein said lower section rests against said at least one battery cell and covers a terminal and a vent port of said at least one battery cell.

22. The battery pack as recited in claim 1, wherein said vent chamber is located axially between said at least one electronics component and a vent port of said at least one battery cell.

23. The battery pack as recited in claim 1, comprising a first seal and a second seal that fluidly isolate said vent chamber from a separate chamber of said lower section that houses a terminal of said at least one battery cell.

24. The battery pack as recited in claim 18, wherein said integrated module is a separate structure from any portion of said enclosure assembly.

25. The battery pack as recited in claim 24, wherein said surface is a top surface of said battery cell, said first section is an upper section of said integrated module, and said second section is a lower section of said integrated module, wherein said upper section extends directly over top of said lower section and said lower section extends directly over top of said top surface.

26. The battery pack as recited in claim 25, wherein an outer perimeter of said vent chamber is established by a wall of said integrated module that separates said upper section from said lower section, said top surface of said battery cell, and two foam strip seals that extend between said wall and said top surface.

* * * * *